(12) United States Patent
Rittenburg et al.

(10) Patent No.: US 8,947,794 B2
(45) Date of Patent: Feb. 3, 2015

(54) LABEL WITH INTEGRATED THIN FILM MAGNIFIER

(75) Inventors: Lorna Rittenburg, Perkasie, PA (US); James Rittenburg, Perkasie, PA (US)

(73) Assignee: IC Optix, Perkasie, PA (US)

( * ) Notice: Subject to any disclaimer, the term of this patent is extended or adjusted under 35 U.S.C. 154(b) by 88 days.

(21) Appl. No.: 13/451,193

(22) Filed: Apr. 19, 2012

(65) Prior Publication Data

US 2012/0268837 A1    Oct. 25, 2012

Related U.S. Application Data

(60) Provisional application No. 61/478,181, filed on Apr. 22, 2011.

(51) Int. Cl.
| | | |
|---|---|---|
| *G02B 27/02* | (2006.01) | |
| *G02B 3/08* | (2006.01) | |
| *G02B 25/00* | (2006.01) | |
| *B32B 7/12* | (2006.01) | |
| *B32B 27/08* | (2006.01) | |
| *G09F 3/00* | (2006.01) | |

(52) U.S. Cl.
CPC .............. *G02B 3/08* (2013.01); *G02B 25/002* (2013.01); *B32B 7/12* (2013.01); *B32B 27/08* (2013.01); *G09F 3/0288* (2013.01); *G09F 3/0289* (2013.01)
USPC .......................................... 359/802; 359/803

(58) Field of Classification Search
CPC .......... G02B 3/08; G02B 25/002; B32B 7/12; B32B 27/08; G09F 3/0288; G09F 3/0289
USPC .................................................. 359/802, 742
See application file for complete search history.

(56) References Cited

U.S. PATENT DOCUMENTS

| 5,333,907 | A  * | 8/1994 | Schaeffer ........................ 281/42 |
| 2005/0231828 | A1 * | 10/2005 | Bartone ........................ 359/802 |
| 2007/0229989 | A1 * | 10/2007 | Scott et al. .................... 359/802 |
| 2012/0243110 | A1 * | 9/2012 | Robinson ...................... 359/742 |

* cited by examiner

*Primary Examiner* — William Choi
(74) *Attorney, Agent, or Firm* — Clark & Elbing LLP; Paul T. Clark, Esq.; Todd Armstrong

(57) ABSTRACT

The invention features a label having a plurality of layers (e.g., at least two or more layers), in which at least one of the layers includes a thin film magnifier. Also featured are compositions to which the multi-layered label is affixed, methods of affixing the multi-layered label to compositions, and methods of making the multi-layered labels.

33 Claims, 8 Drawing Sheets

LABEL WITH INTEGRATED THIN FILM MAGNIFIER

CROSS REFERENCE TO RELATED APPLICATIONS

This application claims priority to U.S. Provisional Application Ser. No. 61/478,181, filed on Apr. 22, 2011, which is hereby incorporated by reference in its entirety.

FIELD OF THE INVENTION

The invention relates to a multi-layered label having a plurality of layers (e.g., at least two or more layers) in which at least one layer is or includes a thin film magnifying layer, compositions that include the multi-layered label affixed thereto, methods of using the multi-layered label to magnify indicia printed on, e.g., the compositions to which the label is affixed, and methods of manufacturing the multi-layered label.

BACKGROUND OF THE INVENTION

Labels generally contain print in the form of various combinations of text and graphics. The text and graphics on a label generally provide information about the item, package, or container upon which the label is placed. Labels can carry information, such as instructions for use, ingredient lists, specific information regarding pharmaceutical products (e.g., information about safety warnings, contra-indications, dosage, dosage frequency, and drug interactions), promotional information, or a variety of other types of information. The text and graphics often need to be small and densely printed so that all the required or desired information can be included on the label. It is not uncommon for information on a label to be difficult to read without optical aids such as eyeglasses or magnifying glasses. Furthermore, small packages require small labels, which limit the size of print that can be placed on the label.

As they age, people generally experience increased difficulty in reading small print or reading print in dim lighting. Although optical aids such as eyeglasses and other types of magnifying glasses are available and can compensate for deficiencies in sight, they are easily misplaced, lost, broken, or are often not conveniently at hand when needed. While the difficulties of reading small print is prevalent on labels and other packaging components for many industries, it is especially problematic for medicines, which are often packaged in small containers that require substantial amounts of information including: instructions for use, warnings, contraindications, and ingredient lists. In addition, the disproportionate use of medications by elderly consumers, and other consumers with impaired vision, exacerbates the problem.

The difficulty in reading the small print on labels and other packaging components is well recognized and has led practitioners in the art to develop various types of devices to aid the consumer. For example, U.S. Pat. No. 2,961,108 describes a magnifier that is incorporated into a bottle cap, such that when the cap is removed it can be used to magnify the print on the label affixed to the bottle. U.S. Pat. Nos. 5,193,032 and 7,021,489 describe a housing constructed of a magnifying material and adapted to receive a container having a label affixed thereto. The housing magnifies the text on the label of the container once the container is placed in the housing. U.S. Pat. No. 5,309,279 describes a curved convex lens in the shape of a circular open ring or oval that can be attached to a vial, bottle, round container, or other curved objects and moved up and down to magnify text below the attachment point. U.S. Pat. No. 5,204,775 describes a single layer detachable magnifying device designed to be removed from the container on which it is affixed to aid the consumer in reading a label affixed to the container. While the prior art teaches various ways to adapt conventional magnifying lens technology into more convenient optical aids for reading small print, the devices are cumbersome to use, expensive to manufacture, or difficult to implement on a large scale.

U.S. Pat. Nos. 5,284,363 and 6,941,689 describe multilayered labels having layers that can be partially separated and re-adhered multiple times, while U.S. Pat. No. 5,342,093 describes a wrap-around label with a designated portion that can be peeled back from the surface to expose the top surface of an underlying layer. None of these patents addresses the problem of magnifying small print on labels.

Thus, there remains a very significant and growing need for a simple, inexpensive, and widely applicable magnifier system that can be readily associated with any form of packaging to provide an optical aid for reading indicia printed on an article or article packaging.

SUMMARY OF THE INVENTION

The present invention features a multi-layered label having a plurality of layers (e.g., at least 2 or more layers), one layer of which is a magnifying lens layer that can be used to magnify printed indicia on labels and packaging. The multi-layered label may be associated with any number of different types of items, articles, products, or containers, and may be utilized under many different circumstances. In particular, the multi-layered label can be affixed to products, such as medicines, supplements (e.g., vitamins), personal care products (e.g., shampoo, conditioner, lotion, and skin cream), cosmetics, perfumes, foods, beverages, veterinary drugs, agricultural chemicals (e.g., a pesticide, a fungicide, an herbicide, an insecticide, a fertilizer, a rodenticide, and a fumigant), appliances, electrical devices, and other articles or product packaging that carries important information in small print. Additionally, the multi-layered label can also be associated with a wide range of other items including but not limited to magazines, product information sheets, maps, and menus and used as an optical aid for magnifying printed indicia associated therewith.

For example, the label can be applied to pharmaceutical packaging, such as containers, vials, bottles, and cartons. The size of print on these packages is typically quite small due to size constraints of the package and the amount of information that may be required to be placed on the package. In addition the type of information tends to be quite important, such as dosage, dosage frequency, instructions for use, safety warnings, and contraindications. The multi-layered label of the present invention, which includes a magnifying lens in at least one of the layers, can be integrated into labels currently used on pharmaceutical products to provide a magnifying device that is inherent to each package and is always available when needed. Alternatively, a standalone magnifying label could be associated with any part of the package, such as the top surface of a bottle cap.

A first aspect of the invention features a label for application to a composition in which the label has a plurality of layers that include at least a top layer (e.g., a first layer) and a terminal layer (e.g., a second layer), and at least one of the plurality of layers is a lens layer having a lens for magnifying indicia present on the label or the composition. In an embodiment, there is substantially no void space between the plurality of layers (e.g., between two immediately adjacent layer that are in direct contact). In other embodiments, more than two (or all) of the layers have substantially no void space over at least 60% or more (e.g., 70%, 80%, 90%, 95%, 99%, or more) of the surface area of the layers when the layers are laid flat against their immediately adjacent layer(s). In other embodiments, the label includes three or more layers (e.g., 4, 5, 6, 7, 8, 9, or 10 or more layers). The layers may be separate and distinct from each other or the label may be a contiguous sheet that is folded to produce the plurality of layers (e.g., the sheet may be self-overlapping). In still other embodiments, the label includes an adhesive material (e.g., the adhesive material may be present on all or a portion of one or more of the layers of the label. For example, at least a portion of the outer surface of the terminal layer may include an adhesive material (e.g., a releasable and resealable adhesive material or a substantially non-releasable adhesive material). In still other embodiments, the outer surface of the terminal layer includes a release backing material (e.g., a paper or plastic (e.g., polypropylene) material) that covers, and can be removed to expose, the adhesive material. The release backing material can include a siliconized material.

In other embodiments of the first aspect of the invention, one or more of the plurality of layers includes an adhesive material (e.g., a pressure sensitive adhesive (PSA) material). For example, the adhesive material may be a substantially non-releasable adhesive material that covers at least a first edge portion of the plurality of layers to form a hinge region or the adhesive material may be a substantially releasable and resealable adhesive material (e.g., a PSA) that covers substantially the entire inner surface of at least one of the plurality of layers (e.g., the adhesive material covers substantially the entire inner surface of the top layer).

In yet another embodiment of the first aspect of the invention, the top layer includes the lens. In other embodiments, one or more of the plurality of layers includes printed matter. In still other embodiments, the lens layer (or one or more other layers of the label) is a plastic material (e.g., polyurethane, vinyl, acrylic, polystyrene, polyethylene, or polycarbonate); and/or has a thickness of about 0.6 mm or less (e.g., about 0.5 mm, 0.4 mm, 0.2 mm, or 0.05 mm or less, or a thickness in the range of about 0.025 mm to about 1.0 mm (e.g., about 0.025 mm to about 0.1 mm or about 0.05 mm to about 0.1 mm)); and/or has a magnifying strength in the range of about 1.2× to about 20× (e.g., about 2× to about 10× (e.g., about 5×)); and/or has a groove pitch in the range of about 0.1 mm to about 1.0 mm (e.g., about 0.2 mm, 0.3 mm, 0.4 mm, or 0.5 mm); and/or has a focal length in the range of about 5 mm to about 115 cm (e.g., about 10 mm to about 80 mm). In other embodiments, the lens layer has a groove pitch of about 0.2 mm and a focal length in the range of about 100 mm to about 115 cm; a groove pitch of about 0.3 mm and a focal length in the range of about 30 mm to about 900 mm; or a groove pitch of about 0.5 mm and a focal length in the range of about 50 mm to about 900 mm.

In other embodiments of the first aspect of the invention, one or more of the plurality of layers has a length of about 2 mm to 500 mm and a width of about 2 mm to about 500 mm (e.g., the lens layer, or one or more of the other layers of the label, may have the same or different dimensions). In still other embodiments, the lens layer has a Shore hardness of about D20 to about D80; and/or a flexural modulus in the range of about $50 \times 10^3$ to about $600 \times 10^3$ pounds per square inch (PSI); and/or a tensile modulus in the range of about $50 \times 10^3$ to about $700 \times 10^3$ PSI. In yet other embodiments, the lens layer is capable of magnifying printed indicia when placed at a distance of about 5 mm to about 70 mm from the indicia. Magnification of the printed indicia may occur by completely or partially manually separating the lens layer from one or more of the plurality of layers of the label.

A second aspect of the invention features a label for application to a composition that includes a first layer having top and bottom surfaces, in which the bottom surface is at least partially coated with an adhesive material, a thickness of about 400 µm or less (e.g., a thickness of about 200 µm or about 50 µm or a thickness in the range of about 25 µm to about 400 µm, e.g., about 30 µm to about 90 µm), and, as all or a part of the first layer, a substantially flat, flexible lens for magnifying indicia present on the label or the composition, and a second layer that includes a release backing material (e.g., a plastic (such as polypropylene) or paper release backing) that is affixed to the bottom surface of the first layer by the adhesive material, in which the second layer is separable from the first layer to expose the adhesive material on the first layer. In an embodiment, the release backing material is siliconized. In other embodiments, the label of the second aspect includes one or more additional layers. In still other embodiments, the adhesive material (e.g., a PSA) covers substantially the entire bottom surface of the first layer. In other embodiments, one or more of the additional layers include printed indicia. The first layer or one or more of the additional layers may be a plastic material (e.g., polyurethane, vinyl, acrylic, polystyrene, polyethylene, or polycarbonate).

In other embodiments of the second aspect of the invention, the lens of the first layer has a magnifying strength in the range of about 1.2× to about 20× (e.g., about 2× to about 10× (e.g., about 5×)); and/or a groove pitch in the range of about 0.1 mm to about 1.0 mm (e.g., about 0.2 mm, 0.3 mm, 0.4 mm, or 0.5 mm); and/or a focal length in the range of about 5 mm to about 115 cm (e.g., about 10 mm to about 80 mm). In other embodiments, the lens of the first layer has a groove pitch of about 0.2 mm and a focal length in the range of about 100 mm to about 115 cm; a groove pitch of about 0.3 mm and a focal length in the range of about 30 mm to about 900 mm; or a groove pitch of about 0.5 mm and a focal length in the range of about 50 mm to about 900 mm. In other embodiments of the first aspect of the invention, one or more of the plurality of layers has a length of about 2 mm to 500 mm (e.g., about 12 mm, 20 mm, 30 mm, 40 mm, 50 mm, 100 mm, or 200 mm or more) and a width of about 2 mm to about 500 mm (e.g., about 12 mm, 20 mm, 30 mm, 40 mm, 50 mm, 100 mm, or 200 mm or more). In addition, the lens layer, or one or more of the other layers of the label, may have the same or different dimensions. In still other embodiments, the first layer has a Shore hardness of about D20 to about D80; and/or a flexural modulus in the range of about $50 \times 10^3$ to about $600 \times 10^3$ pounds per square inch (PSI); and/or a tensile modulus in the range of about $50 \times 10^3$ to about $700 \times 10^3$ PSI. In yet other embodiments, the lens of the first layer is capable of magnifying printed indicia when placed at a distance of about 5 mm to about 70 mm from the indicia. Magnification of the printed indicia may occur by completely or partially manually separating the first layer of the label from the release backing material, one or more of the additional layers of the label, if present, or the composition to which the first layer is affixed.

A third aspect of the invention features a composition that includes a label of the first or second aspect of the invention affixed thereto.

A fourth aspect of the invention features a method of manufacturing a label of the first or second aspect of the invention. The method includes preparing a master mold for the lens layer using, e.g., precision diamond machining (e.g., diamond turning, such as single point diamond turning or included angle diamond turning (InADiT)). Once the master mold is prepared, the method may include casting the lens layer using a polymeric material (e.g., polyurethane, vinyl, acrylic, polystyrene, polyethylene, or polycarbonate or a high refractive index UV curable polymer). The method further includes producing a lens layer having a thickness of about 0.6 mm or less (e.g., about 0.5 mm, 0.4 mm, 0.2 mm, or 0.05 mm or less, or a thickness in the range of about 0.025 mm to about 1.0 mm (e.g., about 0.025 mm to about 0.1 mm or about 0.05 mm to about 0.1 mm)); and/or a magnifying strength in the range of about 1.2× to about 20× (e.g., about 2× to about 10× (e.g., about 5×)); and/or a groove pitch in the range of about 0.1 mm to about 1.0 mm (e.g., about 0.2 mm, 0.3 mm, 0.4 mm, or 0.5 mm); and/or a focal length in the range of about 5 mm to about 115 cm (e.g., about 10 mm to about 80 mm). In other embodiments, the method includes producing a lens layer having a groove pitch of about 0.2 mm and a focal length in the range of about 100 mm to about 115 cm; a groove pitch of about 0.3 mm and a focal length in the range of about 30 mm to about 900 mm; or a groove pitch of about 0.5 mm and a focal length in the range of about 50 mm to about 900 mm. In other embodiments of the fourth aspect of the invention, the method includes producing a label having one or more of the plurality of layers. In other embodiments, one or more of the layers includes an adhesive material, which may be applied during the manufacturing process. In other embodiments, the method also includes applying an optional release backing material to the final layer of the label (e.g., a plastic or paper material, such as a siliconized material) and/or manufacturing one or more of the layers of the label to include an optional pull tab. The pull tab may be present on one or more of the layers of the label and may be present at an edge portion of the one or more layers. The pull tab may include a non-adhesive material. The pull tab may also be configured for grasping or holding (e.g., the pull tab may be configured to allow a user to grasp or hold one or more of the layers of the label, such as the lens layer). In yet other embodiments, the method includes the manufacture of one or more layers of the label, including the lens layer, having a length of about 2 mm to 500 mm (e.g., a length of about 12 mm, 20 mm, 30 mm, 40 mm, 50 mm, 100 mm, or 200 mm or more) and a width of about 2 mm to about 500 mm (e.g., a width of about 12 mm, 20 mm, 30 mm, 40 mm, 50 mm, 100 mm, or 200 mm or more). In other embodiments, the lens layer, or one or more of the other layers of the label, may have the same or different dimensions. In still other embodiments, the lens layer may be manufactured to have a Shore hardness of about D20 to about D80; and/or a flexural modulus in the range of about $50 \times 10^3$ to about $600 \times 10^3$ pounds per square inch (PSI); and/or a tensile modulus in the range of about $50 \times 10^3$ to about $700 \times 10^3$ PSI. In yet other embodiments, the lens layer manufactured according to the methods of the invention is capable of magnifying printed indicia when placed at a distance of about 5 mm to about 70 mm from the indicia. Magnification of the printed indicia may occur by completely or partially manually separating the lens layer from one or more of the plurality of layers of the label.

In an embodiment of all aspects of the invention, the lens is a Fresnel lens. In other embodiments of all aspects of the invention, the composition is a pharmaceutical product, a bottle cap, an agricultural chemical product, a veterinary product, a personal care product, a supplement product, a food product, a beverage product, a cosmetic product, a book, a magazine, a product information sheet, advertising literature, promotional literature, a map, a menu, an appliance, an electrical device, or a container. In yet other embodiments of all aspects of the invention, the adhesive material is a pressure sensitive adhesive (PSA), a non-reactive adhesive, a contact adhesive, a hot melt adhesive, a reactive adhesive, a one-part adhesive, a natural adhesive, or a synthetic adhesive. In other embodiments, the adhesive material is an elastomer, a thermoplastic, an emulsion, or a thermoset (e.g., an acrylic, a synthetic or natural rubber, an ethylene-vinyl acetate (EVA). a nitrile, a silicone, a styrene block copolymer, or a vinyl ether). In another embodiment of all aspects of the invention, the label may include a pull tab. The pull tab may be present on one or more of the layers of the label and may be present at an edge portion of the one or more layers. The pull tab may include a non-adhesive material. The pull tab may also be configured for grasping or holding (e.g., the pull tab may be configured to allow a user to grasp or hold one or more of the layers of the label, such as the lens layer).

When constructed with a non-permanent adhesive, the magnifying lens layer of the multi-layered label may be separated from the label (either partially or completely), used to read or view information on any part of the multi-layered label, a composition to which the label is affixed, or another composition or label (e.g., a composition or label that is not affixed to or connected with the multi-layered label), and then re-adhered to the multi-layered label so that it will be ready for future use. Furthermore, since drugs are often removed from their original container by pharmacists and repackaged in new containers for dispensing, it would be possible for the pharmacist to associate the multi-layered label of the present invention with the new container of dispensed drug.

The invention features a novel label design that integrates into its construction a thin film magnifier element. The label provides a convenient, low cost, highly adaptable, self-contained magnifier system that can be provided in a widespread manner to the consumer as an inherent component of any product, item, or packaging that carries the label.

The thin film magnifier integrated into the label of the present invention can be used as an optical aid for viewing any printed information including information on the label or on any other component of the item or packaging.

The labels of the invention feature the use of thin film magnifier technology, such as Fresnel lens or micro-lens array technology, which allows the magnifying element to be formed into a thin transparent film suitable for integration into a label construction. The label can be constructed such that the magnifying layer can be peeled back from the surface of the label and either partially or totally removed for use. The magnifying film can be an integral part of the primary label of the container, item, or package; or it can be used as a separate label, which is applied elsewhere on the package, for example the top surface of a container cap. Once the magnifying layer is peeled back, unfolded, or removed from the multi-layered label, it can be positioned at a suitable distance according to the focal length of the lens such that the print or object to be observed appears focused and magnified. To those skilled in the art of making labels, there are many different types of adhesives and release coatings commonly used to facilitate the construction of multi-layered labels in which layers can be peeled back and partially or totally removed and re-adhered multiple times. Examples of adhesives that can be used in the construction of multi-layered labels include but are not limited to an acrylic (e.g., a polyacrylate or an emulsion acrylic), a synthetic or natural rubber (e.g., butyl rubber or a polyisoprene based rubber) a hot-melt adhesive (e.g., ethylene-vinyl acetate (EVA)), a nitrile, a silicone (e.g., a silicone rubber or an ultra-violet (UV) curable silicone compound), a styrene block copolymer (SBC; e.g., styrene-butadiene-styrene (SBS), styrene-ethylene/butylene-styrene (SEBS), styrene-ethylene/propylene (SEP), or styrene-isoprene-styrene (SIS)), and a vinyl ether. The adhesive may be a pressure sensitive adhesive (PSA; e.g., a polyacrylate or a polyisoprene based rubber), a non-reactive adhesive (e.g., a drying adhesive, such as a solvent based adhesive or a polymer dispersion or emulsion adhesive), a contact adhesive, a hot adhesive (e.g., a hot melt adhesive), a reactive adhesive (e.g., a multi-component adhesive (e.g., polyester resin+polyurethane resin; polyols+polyurethane resin; or acrylic polymers+polyurethane resins), a one-part adhesive (e.g., an adhesive curable by radiation (e.g., a UV light curing adhesive or light curing material), heat (e.g., heat curing adhesives, such as epoxies, urethanes, and polyimides), or moisture (e.g., cyanoacrylates and urethanes)), a natural adhesive (e.g., bioadhesives, such as adhesives made from vegetable matter, starch (dextrin), natural resins, or from animals (e.g., casein or animal glue)), a synthetic adhesive (e.g., elastomers, thermoplastics, emulsions, and thermosets). An aqueous composition (e.g., water) may also serve as an adhesive. Release coatings are generally formulated using various types of silicones including UV and thermally curable formulations.

In an embodiment, the label includes printed indicia. The printed indicia may include, e.g., instructions for use of a composition associated with the label, a list of ingredients in a composition associated with the label, information regarding a pharmaceutical product (e.g., information about safety warnings, contra-indications, dosage, dosage frequency, and drug interactions), promotional information, or a variety of other types of information.

The magnifying lens layer of the multi-layered label can operate at focal lengths within the range of about 1 mm to about 100 mm, preferably the range is about 5 mm to about 40 mm. The lens also provides about 1.2× to about 10× magnification when used at the focal lengths described above. In an embodiment, the magnifying lens layer provides a magnification of 2× to 5× (e.g., 3×, 4×, or 5×).

The layers of the label, including the magnifying lens portion of the label, can be about 25 µm in thickness to about 200 µm. In an embodiment, one or more of the label layers is about 50 µm to about 100 µm in thickness (e.g., 60, 70, 80, or 90 µm in thickness).

The magnifying lens portion of the multi-layered label can be manufactured using, e.g., polyurethane, vinyl (e.g., polyvinylchloride (PVC)), acrylic (e.g., poly(methyl methacrylate) (PMMA)), polystyrene, polyethylene terephthalate (PET), polyethylene (PE; e.g., high density polyethylene (HDPE)), and polycarbonate. Other materials may also be used. In an embodiment, the material used provides a thin, but resilient, flexible film.

In another aspect, the multi-layered label can be affixed to publications, such as product information sheets, magazines, and maps, so that the magnifying label can be used to magnify indicia present on these types of publications. The low cost and versatility of the magnifying label of the present invention allows for its incorporation into each copy of the publication so that a magnifier is always available for use if needed. This overcomes a common problem with other types of optical aids such as eyeglasses and conventional magnifiers, which is, they are not conveniently at hand when needed.

The present invention also features a novel magnifying device obtained by integrating a low cost magnifying element into a label construction using conventional label manufacturing technology and processes. Thus, the multi-layered magnifying label of the present invention can be readily associated with a wide variety of existing consumer products, in a widespread manner, at low cost and with low impact to current manufacturing processes. The present invention can be produced in many variations of shape, size, and construction, and associated with an unlimited variety of items and will provide benefit to the mass consumer market.

DEFINITIONS

As used herein, the term "about" means±10% of the recited value.

By "a layer," for use in the label of the present invention, is meant a coated or uncoated material, including but not limited to, e.g., paper, a polymer, a cloth, a metal, or other material, that may be affixed to another layer, or to an container or article, using an adhesive material. The layer may be coated with another material, such as a plastic or a silicone. The adhesive material is not considered a layer. The layer may include printed indicia or may lack such indicia. The layer may also be transparent or include coloration. All or a part of one or more layers may also include a lens material (e.g., a polymeric material) that is substantially transparent and that can be used to magnify indicia present on another layer or on a container or article.

By "plurality of layers" is meant two or more layers (e.g., 3, 4, 5, 6, 7, 8, 9, 10 or more layers) that are associated together to form a label of the invention. The layers may be releasably associated with each other or they may be non-releasably associated with each other, e.g., over a region of the layers (e.g., the layers may include a hinge region at one edge that is a non-releasable attachment point). In an embodiment, one or more of the layers that are non-releasably associated in a label may also include a perforation that allows one or more of the layers to be easily removed from the label by tearing along the perforation. The labels of the invention may be capable of fixation to, e.g., a container or article using, e.g., an adhesive material.

By "substantially no void space," with respect to two immediately adjacent layers of a label of the invention, is meant that a first layer is in direct contact with an immediately adjacent second layer over at least 60% (e.g., 70%, 80%, 90%, 95%, or 99% or all) of the surface area of the first layer when the first layer is laid flat against the second layer. In this configuration, the first and second layers of the label are not separated from each other by, e.g., a spacer or other material that is designed to create a void space between the two adjacent layers that prevents the first layer from making direct contact with the second layer over at least 60% of the surface area of the first layer.

Other features and advantages of the invention will be apparent from the drawings, the following detailed description, and from the claims.

BRIEF DESCRIPTION OF THE DRAWINGS

FIG. 4(a) shows a cross-sectional view of the multi-layer label (8) in its extended form. FIG. 4(b) shows a cross-sectional view of the multi-layer label (8) taken along the axis (3) shown in FIG. 4(c). The multi-layer label (8) shown in FIG. 4(b) has been wrapped around and affixed to a container (2). FIG. 4(c) shows a perspective view of the container (2) of FIG. 4(b) in which the magnifying lens layer (10) has been separated from label portion (26b) and showing label portion (26a) also separated from magnifying lens layer (10). Once separated from label portions (26a and 26b), magnifying lens layer (10) can be used to magnify printed indicia (40) present on either label portion.

FIG. 5(a) shows the multi-layer label for use with a bottle cap prior to application. FIG. 5(b) shows the multi-layer label affixed to a bottle cap. FIG. 5(c) shows the magnifying lens layer of the multi-layer label being used to magnify printed indicia on the label of the bottle once the magnifying lens layer is separated from the multi-layer label.

DETAILED DESCRIPTION OF THE INVENTION

Figure 1:
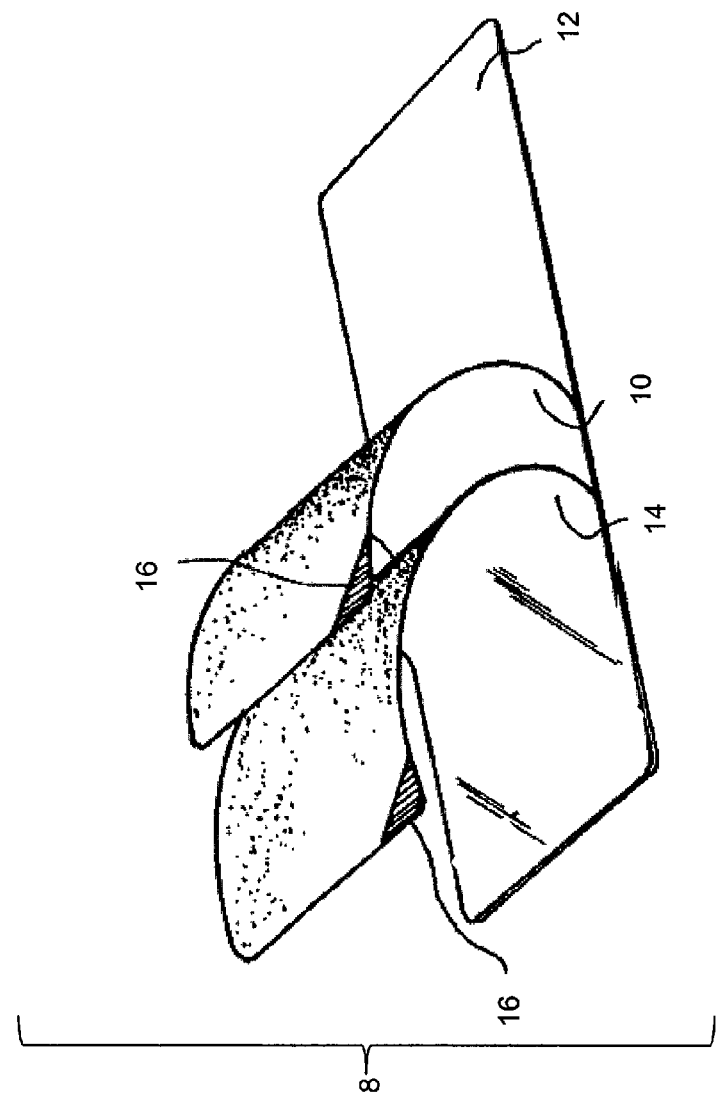
FIG. 1 is a perspective view of an embodiment of a multi-layer label (8) with an integrated magnifying lens layer of the present invention that includes terminal layer (12), magnifying lens layer (10), and top layer (14). Also shown is optional pull tab (16).

The invention features multi-layered labels that include an integrated thin film lens layer that may be used to magnify printed indicia, e.g., in or associated with the multi-layered label, on a composition to which the multi-layered label is also affixed, on a label affixed to a composition to which the multi-layered label is also affixed, or on an unrelated composition. In particular, the lens layer of the multi-layered label may be used on products or their containers and/or packaging. Non-limiting examples of such products include medicines or pharmaceuticals, supplements (e.g., vitamins), personal care products (e.g., shampoo, conditioner, lotion, and skin cream), cosmetics, perfumes, foods, beverages, veterinary drugs, agricultural chemicals (e.g., containers for a pesticide, a fungicide, an herbicide, an insecticide, a fertilizer, a rodenticide, or a fumigant), agricultural products, appliances, electrical devices, product information sheets, advertising literature, promotional literature, menus, maps, books, magazines, or any other product or packaging that carries important information in small print.

The multi-layered label is designed with the thin film magnifying lens layer integrated into its construction. The multi-layered label provides a convenient, low cost, highly adaptable, self-contained magnifier system that can be provided in a widespread manner to the consumer as an inherent component of any product or item that carries the label. In particular, the multi-layered labels of the invention feature the use of thin film magnifier technology, such as Fresnel lens or micro-lens array technology, which enable the magnifying element to be formed into a thin transparent film suitable for integration into a label construction. The label can be constructed such that the magnifying lens layer can be peeled back from the surface of the label and either partially or totally removed from the label during use. Once use of the lens layer is complete, it may be re-adhered to the label using an adhesive material (e.g., a pressure sensitive adhesive material) that is incorporated into one or more of the layers of the multi-layered label. In alternative embodiments, the magnifying lens layer may be unfolded from the multi-layered label during use and, once such use is complete, refolded back into its original position in the label.

The magnifying film can be an integral part of the primary label of a container, item, or package; or it can be used as a separate label, which is applied elsewhere on the package, for example the top surface of a container cap. Once the magnifying layer is peeled back from, unfolded, or removed from the label, it can be positioned at a suitable distance according to the focal length of the lens such that the print or object to be observed appears focused and magnified. To those skilled in the art of making labels, there are many different types of adhesives and release coatings commonly used to facilitate the construction of multilayered labels in which layers can be peeled back and partially or totally removed and re-adhered multiple times (see, e.g., Cray, "Silicone Release Coatings for the Pressure Sensitive Adhesive Industry," Chapter 9, "Silicones in Industrial Applications" in *Inorganic Polymers*, Nova Science Publishers; ed. Roger De Jaeger and Mario Gleria, 2007).

The multi-layered label features at least one layer that is a thin film magnifying lens layer having a thickness in the range of about 25 µm to about 1.0 mm (e.g., a thickness in the range of about 30 µm to about 500 µm in thickness, preferably a thickness in the range of about 30 µm to about 200 µm (e.g., 30, 40, 50, 60, 70, 80, or 90 µm in thickness)). In an embodiment, the lens layers has a thickness of 50 µm or less.

The lens layer of the multi-layered label may operate at focal lengths within the range of about 1 mm to about 200 mm (e.g., focal lengths in the range of about 5 mm to about 100 mm, about 5 mm to about 40 mm, or about 10 mm to about 80 mm). The magnifying lens layer also provides about 1.2× to about 10× magnification (e.g., about 2× to about 5× magnification (e.g., 2×, 3×, 4×, or 5× magnification)). For example, the magnifying lens layer may provide about 2× to about 3× magnification of target indicia when placed at a distance of approximately at 2.5 cm from the indicia. The magnifying lens layer of the multi-layered label can be manufactured using any of a variety of acceptable materials including, e.g., polyurethane, vinyl (e.g., polyvinylchloride (PVC)), acrylic (e.g., poly(methyl methacrylate) (PMMA)), polystyrene, polyethylene terephthalate (PET), polyethylene (PE; e.g., HDPE), and polycarbonate. In another embodiment, the magnifying lens layer of the multi-layered label is PMMA or PET. Other suitable materials may also be used.

The multi-layered label may be sized and shaped according to the needs of the user or the size and/or shape of the composition to which the multi-layered label will be affixed. In other embodiments, each of the layers of the multi-layered label, including the magnifying lens layer, may be the same size and shape. In other embodiments, one or more of the layers of the multi-layered label may be a different size and/or shape. For example, each layer of the multi-layered label may be about 2 mm to about 500 mm wide and about 2 mm to about 500 mm long (e.g., 52 mm×82 mm; 60 mm×60 mm; 65 mm×190 mm; 95 mm×135 mm; 180 mm×260 mm; 190 mm×300 mm; 225 mm×160 mm; 260 mm×260 mm; 395 mm×395 mm). In other embodiments, the magnifying lens layer of the multi-layered label has a different size and/or shape relative to the other layer(s). In particular, the magnifying lens layer may be wider or longer, which may allow the magnifying lens layer to be, e.g., unfolded from the multi-layered layer and used to magnify printed indicia without having to remove the magnifying lens layer from the multi-layered label. There now follows a description of particular embodiments of the invention.

Structure of the Multi-Layered Label

The multi-layered label of the present invention features a plurality of superimposed layers (e.g., at least 2, 3, 4, 5, 6, 7, 8, 9, or 10 layers or more), at least one of which is a magnifying lens layer. One or more of the layers of the label may include printed indicia (e.g., words, pictures, symbols, or other information). The printed indicia may include, e.g., instructions for use of a composition associated with the label, a list of ingredients in a composition associated with the label, specific warning information, promotional information, or a variety of other types of information. If desired, both sides of one or more layers of the label, only one side, or neither side of one or more of the layers of the label may include printed information (including or excluding the magnifying lens layer).

Figure 2:
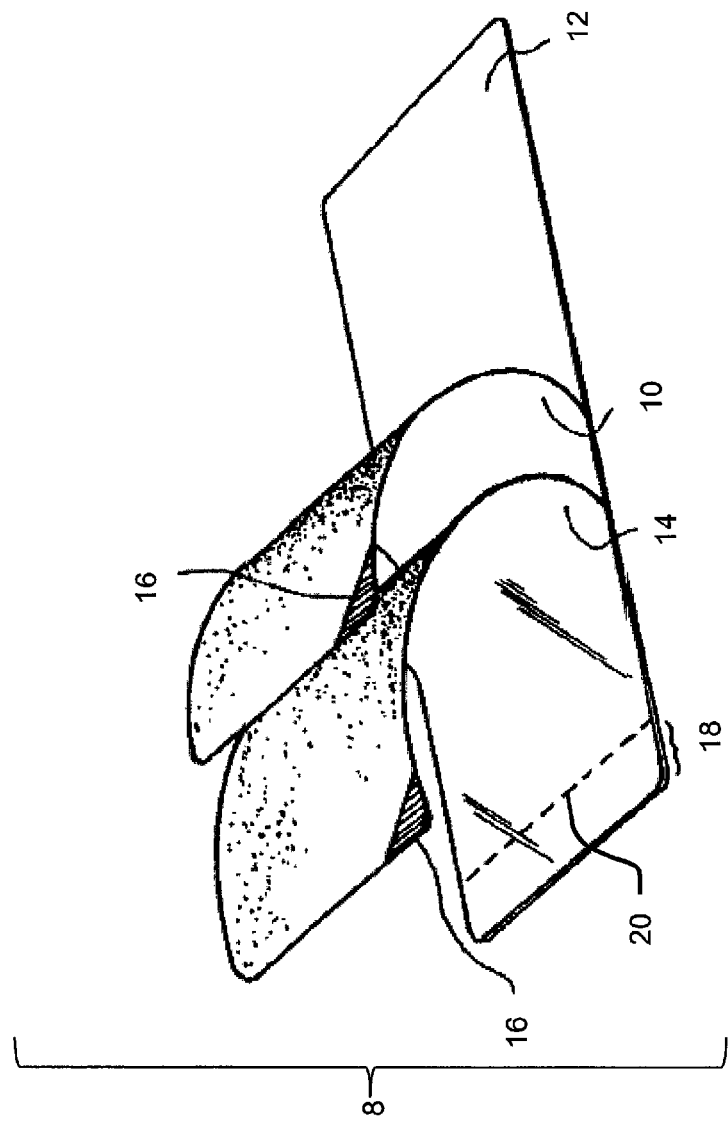
FIG. 2 is a perspective view of another embodiment of a multi-layer label (8) with an integrated magnifying lens layer that shows terminal layer (12), magnifying lens layer (10), top layer (14), optional pull tab (16), and hinge region (18), which contains an adhesive material that permanently bonds the three depicted layers together to form a booklet. Also shown is an optional perforation (20), which can be included with one or more of the layers of the multi-layer label (8) and that would allow that/those layer(s) to be separated from the multi-layered label by tearing along the perforation.

Referring now to the invention in more detail, FIGS. 1 and 2 depict embodiments of a multi-layer label (8) of the invention. As shown in FIGS. 1 and 2, multi-layer label (8) includes three layers: magnifying lens layer (10), terminal layer (12), and top layer (14). In FIGS. 1 and 2, magnifying lens layer (10) is shown laminated between terminal layer (12) and top layer (14). If desired, additional layers may be included between terminal layer (12) and magnifying lens layer (10) or between magnifying lens layer (10) and top layer (14). Also shown in FIGS. 1 and 2 is optional pull tab (16), which is a portion of the layer(s) that lacks an adhesive material or that includes a material that coats and deadens the adhesive material. Optional pull tab (16), which may be placed along any portion of the edge of the layer, facilitates separation and peeling open of the layer(s) of the multi-layered label. FIG. 2 also depicts optional hinge region (18), which includes an adhesive material that permanently bonds the three depicted layers together to form a booklet, and optional perforation (20), which can be included with one or more of the layers and would allow that/those layer(s) to be separated from the multi-layered label by tearing along the perforation.

One or more of the layers of the multi-layered label, including the magnifying lens layer, may have a thickness in the range of about 25 µm to about 5 mm (e.g., a thickness in the range of about 25 µm to about 2 mm, more preferably a thickness in the range of about 25 µm to about 200 µm (e.g., 60, 70, 80, or 90 µm in thickness). In addition, one or more of the layers of the multi-layered label, including the magnifying lens layer, may be affixed to the terminal layer (or to each successive layer as additional layers are added to the label) using a releasable and resealable adhesive material. The terminal layer may include an adhesive material on its outer surface (i.e., the surface that faces away from the other layers of the label and that is the surface that is intended to contact the composition or article to which the label may be affixed).

The adhesive material on the terminal layer may be releasable and resealable or it may include an adhesive material that is substantially permanent (i.e., not substantially releasable without damage to the label). The terminal layer may also include a release backing material (e.g., a silicon-based material) that covers the adhesive material (to prevent unwanted adhesion) and that can be removed (e.g., by peeling the material away from the terminal layer) to expose the adhesive material prior to contact to a composition or article.

In several embodiments, the adhesive material used between one or more layers of the label is one that allows the layer(s) to be repeatedly separated from the label, each other, or from other compositions or articles to which the layer may be affixed after it is separated from the label, and re-adhered. A preferred adhesive is a PSA. Other adhesive materials are described below. The terminal layer may also include an adhesive material that allows the terminal layer to be repeatedly separated from a composition or article to which the terminal layer has been affixed and re-adhered. The terminal layer may also include a non-releasable adhesive, e.g., if removal of the terminal layer (or the label as a whole) is not desired.

The plurality of layers of the multi-layered label may be laminated to, but capable of complete, but resealable, separation from, each other. Alternatively, one or more of the layers of the multi-layered label may be permanently laminated at one end (e.g., at a hinge region) to form a booklet. In this alternative embodiment, a more permanent bond forms between one or more of the layers at the hinge region that prevents one or more of the layers from being completely separated from each other or from the multi-layered label. It should be appreciated that the word "permanent," as used herein, is a relative term. The "permanent" bond formed at the hinge region is a relatively permanent bond compared to the releasable bond formed by an adhesive material between one or more of the layers of the multi-layer label. It is, of course, to be understood that the layers affixed at the hinge region may likely be completely separable from one another upon the application of a sufficiently great separation force. Yet, under these circumstances, the label would, in all likelihood, be of no further use. In another embodiment, the layers of the label, including the magnifying lens layer, may include a perforation adjacent to the hinge region that allows for detachment of one or more of the layer(s) of the label, including, e.g., the magnifying lens layer.

The magnifying lens layer of the multi-layered labels of the invention feature the use of thin film magnifier technology, such as Fresnel lens or micro-lens array technology, which allow the magnifying element to be formed into a thin transparent film (e.g., having a thickness of, e.g., about 400 µm or less (e.g., about 25 µm, 50 µm, 100 µm, or 200 µm) suitable for integration into a label construction. In an embodiment, the thin film magnifying element has a thickness of about 50 µm or less.

Figure 3:
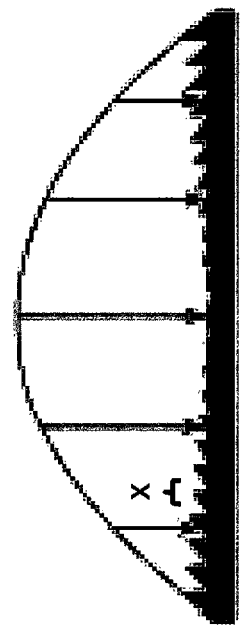
FIG. 3 is a cross-sectional view of the surface of a Fresnel lens. The area designated by the X is the distance signifying the groove pitch of the lens.

An example of a cross-section of a Fresnel lens is shown in FIG. 3. The groove pitch is the distance between two peaks (shown as X in FIG. 3). Magnifying lens layers based on Fresnel lens technology can be made using multiple different focal lengths and with a wide range of different groove pitches (e.g., in the range of about 0.2 mm to 0.5 mm).

Figure 4:
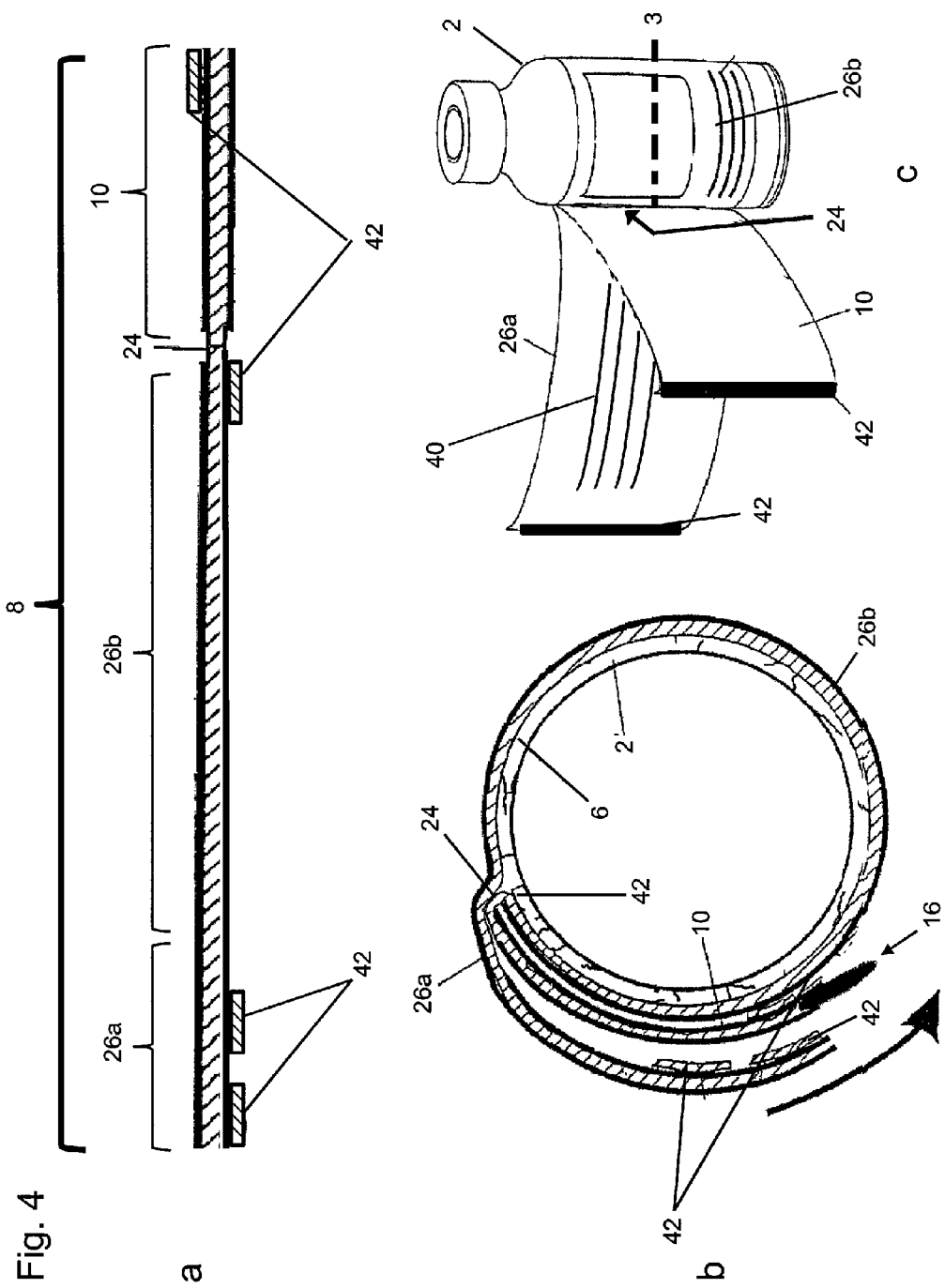
FIGS. 4(a)-(c) are views of another embodiment of the multi-layer label (8) with an integrated magnifying lens layer of the present invention that is a wrap-around type label.

In still other embodiments, the multi-layered label of the present invention is a self-overlapping wrap-around label that is produced as a single piece of material, but that may be folded over to produce a label having multiple layers or may be applied to a composition in such a way to produce a plurality of layers. For example, the multi-layered label may be wrapped around a container to produce the plurality of layers, one of which is a magnifying lens layer. An example of this type of label is found in, e.g., U.S. Pat. No. 6,941,689, which is incorporated herein by reference in its entirety. In this embodiment, which is depicted in a cross sectional view in FIGS. 4(a) and (b) taken across line (3) shown in FIG. 4(c), multi-layered label (8) is formed as a single piece of material with distinct portions that include magnifying lens layer portion (10) and label portions (26a and 26b). None, all, or a portion of label portions (26a and 26b) may include printed indicia (40). To form multi-layered label (8), magnifying lens layer portion (10) can be folded at fold site (24) and affixed to label portion (26b) using one or more non-permanent adhesive regions (42) associated with magnifying lens layer portion (10). Label portion (26b) can then be affixed around external surface (6) of container (2) near fold site (24) using one or more non-permanent adhesive regions (42) and the remainder of label portion (26b) can be wrapped around container (2) in the direction of the arrow shown in FIG. 4(b) until label portion (26a) overlaps magnifying lens layer (10). Label portion (26a) can then be affixed to magnifying lens layer (10) or to label portion (26b) using, e.g., one or more non-permanent adhesive regions (42). This wrap-around type label may be applied to round or substantially round containers (e.g., pharmaceutical prescription vials and bottles), as shown in the embodiment of FIG. 4(b). The wrap around label may also be applied to containers having other shapes or to flat surfaces. Formation of multi-layered label (8) upon application to flat surfaces may occur by producing multiple folds in the material depicted in FIG. 4(a). In other embodiments, the positions of magnifying lens layer (10) and label portion (26a) may be switched.

Magnifying lens layer portion (10) of multi-layered label (8) may be unfolded by pulling on optional pull tab (16) and used to magnify portions of the label having printed indicia, printed indicia associated with a composition to which the label is affixed, or printed indicia on an unrelated composition (e.g., a composition or article to which the label is not affixed). The magnifying lens layer portion of the self-overlapping wrap-around label can be restored to its folded position once use of the lens layer is completed.

In yet other embodiments, where tamper proof packaging is desirable and in some cases required, one of the layers may include a security feature that may include, e.g., printed warnings or other indicia, or microtext, that make it evident to, e.g., a retailer or customer, that tampering has occurred in the event that an attempt to remove one of the labels, e.g., the terminal label, has been made or the layer has been removed. The security feature may be present in or on any one or more of the layers of the label. The security feature may also be integrated into one or more of the layers of the label. For example, the security feature may be incorporated into the inner or outer surface of one or more of the layers of the label. In an embodiment, the security feature is a part of the terminal layer. In another embodiment, a security feature is used in a multi-layered label for application to a pharmaceutical product.

For example, the security feature may be a self-destructing label, a void label, a security label, or a holographic foil security label that is designed to separate into layers when removed or if attempts to remove the security layer are made. Self-destructing labels are designed so that they cannot be removed without some sign of tampering. These labels can be printed with branding, certification and product information, including barcodes and serialized data. Void labels are made to expose a pattern and/or words when the label is peeled off, which leaves a patterned adhesive on the substrate. Security labels are designed to indicate or reveal if a seal has been broken by making it extremely difficult to match a pattern once it has been cut or by revealing words, for example, after a period of time after the seal has been broken. Patterns for security labels are typically laid out diagonally to increase the difficulty of matching up after being cut. Alternatively, the security layer may include a holographic foil security label that reveals a holographic image when it is tilted in the light, microtext that is not legible until magnified, a radio-frequency identification (RFID) tag that provides the ability to track the label or any composition (e.g., a container or article) to which the label is affixed, a security taggant that enables manufacturers to covertly identify their products using microscopic chemical or organic tags, or a specialty ink that can be detected with, e.g., ultra-violet or infrared light. These various labels can also be used to prevent counterfeiting of the product to which the label is affixed.

The magnifying lens layer of the multi-layered label may have the same dimensions (e.g., width, length, and thickness) as the other layers of the label or it may have different dimensions (e.g., it may be longer, wider, or thicker). In an example, the magnifying lens layer may have the same width and thickness but is longer than the other layer(s) of the multi-layered label. In this case, the magnifying lens layer may be folded over and fit in between the layer of the label immediately above the magnifying lens layer or, if the magnifying lens layer is the top-most layer, the magnifying lens layer may be folded over and placed between itself and the layer below it. For a multi-layered label having this configuration, the magnifying lens layer may be used to magnify printed indicia, as desired, by unfolding the magnifying lens layer from the multi-layered label and utilizing the extra length to view and magnify printed indicia within proximity to the elongated magnifying lens layer (e.g., the magnifying lens layer need not be separated from the multi-layered label in order to magnify nearby printed indicia, but may be elongated to facilitate such magnification and restored to its folded state when its use is completed).

Other examples of multi-layered labels, and of methods of making multi-layered labels, can be found in, e.g., U.S. Pat. Nos. 5,284,363 and 6,941,689, both of which are incorporated herein by reference in their entirety.

Materials for the Multi-Layered Label

One or more of the layers of the multi-layered label, in particular, the magnifying lens layer, may be made using a plastic material. For example, the plastic material may be polyurethane, vinyl (e.g., polyvinylchloride (PVC)), acrylic (e.g., poly(methyl methacrylate) (PMMA)), polystyrene, polyethylene terephthalate (PET), polyethylene (e.g., HDPE), or polycarbonate). Other materials may also be used to manufacture the layers of the multi-layered label, in particular, the magnifying lens layer.

The magnifying lens layer of the multi-layer labels of the invention feature the use of thin film magnifier technology, such as Fresnel lens (see, e.g., Davis et al., Optik & Photonik, 2007; Miller et al., J. Opt. Soc. Am. 41:807-814, 1951) or micro-lens array technology (see, e.g., Ren et al., Optics Commun. 261:296-299, 2006; Jahns and Walker, Applied Optics 29:931, 1990), which allow the magnifying element to be formed into a thin transparent film suitable for integration into a label construction. The layers of the multi-layered label other than the magnifying lens layer may be made from paper or other materials (e.g., the paper material may be coated with a plastic material to protect it from damage).

The magnifying lens layer may have a thickness of less than 5.0 millimeters (mm). For example, the magnifying lens material may have a thickness in the range of about 0.025 mm to about 1.0 mm (e.g., a thickness in the range of about 0.025 mm to about 0.6 mm (e.g., about 0.5 mm, 0.4 mm, 0.3 mm, or 0.2 mm in thickness) or a thickness in the range of about 0.025 mm to about 0.2 mm). In several embodiments, the magnifying lens layer has a thickness of about 50 µm to about 100 µm (e.g., a thickness of about 30, 40, 50, 60, 70, 80, or 90 µm).

The magnifying lens layer may also have a magnifying strength in the range of about 1.2× to about 20× (e.g., a magnifying strength of about 2× to about 10× (e.g., about 5× magnifying strength)).

In other embodiments, the magnifying lens of the multi-layered label can operate at focal lengths within the range of about 1 mm to about 115 cm (e.g., a focal length in the range of about 1 mm to about 50 cm, about 5 mm to about 1 cm, about 5 mm to about 100 mm, or about 10 mm to about 80 mm). In other embodiments, the focal length is about 500 mm or less, preferably about 100 mm or less, and more preferably in the range of about 5 mm to about 80 mm). In addition, the magnifying lens layer may include a groove pitch in the range of about 0.1 mm to about 1.0 mm (e.g., a groove pitch of about 0.2 mm, 0.3 mm, 0.4 mm, or 0.5 mm). In several different embodiments, the magnifying lens layer may have the following specifications:

a groove pitch of about 0.2 mm and a focal length in the range of about 100 mm to about 115 cm;

a groove pitch of about 0.3 mm and a focal length in the range of about 30 mm to about 900 mm; or a groove pitch of about 0.5 mm and a focal length in the range of about 50 mm to about 900 mm.

In other embodiments, the magnifying lens layer (or one or more other layers of the multi-layered label) has the following dimensions: a length of about 2 mm to 500 mm and a width of about 2 mm to about 500 mm. The magnifying lens layer may also be flexible (e.g., it may have a flexural modulus in the range of about $50 \times 10^3$ to about $600 \times 10^3$ pounds per square inch (PSI)). The magnifying lens layer may also exhibit a Shore hardness of about D20 to about D80. The magnifying lens layer may also have a tensile modulus in the range of about $50 \times 10^3$ to about $700 \times 10^3$ PSI.

Companies that have the capability of manufacturing Fresnel lenses that can be incorporated into the multi-layered label of the invention include, e.g., Microsharp Corporation Limited (52 Shrivenham Hundred, Business Park, Watchfield, Oxfordshire SN6 8TY, United Kingdom) and Yunmeng Fushen Plastics Co. Ltd, Yumeng, Xiagen City, Hubei, China).

Companies that manufacture multi-layered labels into which a magnifying lens layer may be incorporated to prepare the multi-layered label with integrated thin film magnifier of the present invention include the following: AJS Labels (Lineside Industrial Estate, Littlehampton, West Sussex UK BN17 7HD), SpectraGraphics Labels Systems, Inc. (Lenexa, Kans.), Schreiner MediPharm (OberschleiBheim, Germany), and Securikett (Vienna, Austria).

Adhesive Material

The multi-layer label may include an adhesive material that allows one or more of the layers to be repeatedly partially or fully separated and re-adhered to one another. For example, the interior surfaces of one or more of the layers of the label may be coated with the adhesive material.

Examples of adhesives that can be used in the construction of multi-layered labels include but are not limited to a pressure sensitive adhesive (PSA), a non-reactive adhesive (e.g., a drying adhesive, such as a solvent based adhesive or a polymer dispersion or emulsion adhesive), a contact adhesive, a hot adhesive (e.g., a hot melt adhesive), a reactive adhesive (e.g., a multi-component adhesive (e.g., polyester resin+ polyurethane resin; polyols+polyurethane resin; or acrylic polymers+polyurethane resins), a one-part adhesive (e.g., an adhesive curable by radiation (e.g., a UV light curing adhesive or light curing material), heat (e.g., heat curing adhesives, such as epoxies, urethanes, and polyimides), or moisture (e.g., cyanoacrylates and urethanes)), a natural adhesive (e.g., bioadhesives, such as adhesives made from vegetable matter, starch (dextrin), natural resins, or from animals (e.g., casein or animal glue)), a synthetic adhesive (e.g., elastomers, thermoplastics, emulsions, and thermosets). An aqueous composition (e.g., water) may also serve as an adhesive. Sources of these materials include Trebnick Systems (Springboro, Ohio) and Actega Wit (Cinnaminson, N.J.). The adhesive may also be an acrylic (e.g., an emulsion acrylic), a synthetic or natural rubber (e.g., butyl rubber) a hot-melt adhesive (e.g., ethylene-vinyl acetate (EVA)), a nitrile, a silicone (e.g., a silicone rubber or an ultra-violet (UV) curable silicone compound), a styrene block copolymer (SBC; e.g., styrene-butadiene-styrene (SBS), styrene-ethylene/butylene-styrene (SEBS), styrene-ethylene/propylene (SEP), or styrene-isoprene-styrene (SIS)), and a vinyl ether. Release coatings for release backing materials are generally formulated using various types of silicones including UV and thermally curable formulations. These are available from a number of sources including Actega Wit (Cinnaminson, N.J.) and General Electric Co. (Waterford, N.Y.). Pressure sensitive adhesives include but are not limited to an acrylic material, a butyl rubber, a ethylene-vinyl acetate (EVA) with high vinyl acetate content (e.g., a hot-melt PSA), a natural rubber, a nitrile, and a silicone material (e.g., silicone rubber or an ultra-violet (UV) curable silicone compound). Preferred adhesive materials allow the layer(s) to be repeatedly separated from the multi-layered label or, if used to affix the terminal layer to a composition, from the composition to which the label is affixed, and subsequently re-adhered.

Other adhesive materials include optical adhesives that are substantially free of UV-absorbing chromophores, such as extended aromatic structures or conjugated double bonds. Useful adhesives include, for example: NOA61, a UV cured thiol-ene based adhesive available from the Norland Company (Cranbury, N.J.); Loctite series (e.g., 3492, 3175) UV cured acrylic adhesives available from Henkel Loctite Corp., 1001 Trout Brook Crossing, Rocky Hill, Conn. 06067 (www.loctite.com). OP series (e.g., 21, 4-20632, 54, 44) UV cured acrylic adhesives available from Dymax Corporation, Torrington, Conn.

Other useful adhesives include those compositions described in, e.g., U.S. patent application Publication No. 2004/0202879 (Xia et al.), which comprise at least one polymer with either an acid or base functionality that forms a pressure sensitive adhesive, a high $T_g$ polymer with an weight average molecular weight greater than 100,000 with an acid or base functionality, and a crosslinker, wherein the functionality on the pressure sensitive adhesive and the high $T_g$ polymer cause an acid-base interaction that forms a compatibilized blend. After accelerated aging of the adhesive composition at 80° C. and 90% relative humidity for approximately 500 hours in an oven, the adhesive mixture is translucent or optically clear.

Another useful adhesive includes microstructured adhesive, which includes a continuous layer of a pressure-sensitive adhesive having a microstructured surface, wherein the microstructured surface includes a series of features and wherein the lateral aspect ratio of the features range from about 0.1 to about 10, wherein the spacing aspect ratio of the features range from about 1 to about 1.9, and wherein each feature has a height of about 2.5 to about 375 micrometers. Such adhesives are described in, e.g., U.S. Pat. Nos. 5,650, 215; 6,123,890; 6,315,851; 6,440,880; and 6,838,150.

Other useful adhesives include SOKEN™ 1885 PSA (commercially available from Soken Chemical & Engineering Co., Ltd, Japan), NEA PSA (as described in the Example 1 of U.S. patent application Publication No. 2004/0202879 (Lu et al.)), LENS BOND™ Type C59 (a thermally cured styrene based adhesive available from Summers Optical, Hatfield, Pa., a division of EMS Acquisition Corp., and NOA61™ (a UV cured thiol-ene based adhesive, available from Norland Company, Cranbury, N.J.).

The adhesive material applied to the exterior surface of, e.g., the terminal layer of the multi-layered label may be different from the adhesive material used on the interior surfaces of the layers of the multi-layered label that are intended to be separated and re-adhered. For example, the terminal layer may be coated with an adhesive that does not allow the terminal layer to be separated and re-adhered. In this embodiment, the adhesive material used may promote permanent bonding, as that term is used herein, to a surface to which the terminal layer is affixed, which would preclude separation and re-adherence of the terminal layer of the label from the composition to which the terminal label has been affixed. Examples of permanent bonding adhesive materials include, e.g., solvent-based adhesives, such as polyvinyl acetate (PVAc), ethylene-vinyl acetate, epoxy polymers, polychloroprene, polyurethane polymers, cyanocarylate polymers, acrylic polymers, polyester resins/polyurethane resins, polyols/polyurethane resin, and acrylic polymers/polyurethane resins.

To form a lift tab for one or more of the upper layers above the lower, terminal layer, all or a portion of the outer-most surface of the upper layers (e.g., a corner of the upper layer(s) or at any point along an edge of one or more of the upper layer(s)) may be coated with a non-adhesive material (e.g., a varnish or adhesive deadener, such as EL242 (Pulse Roll Label Products, Bristol, UK)) that deadens the adhesive or, alternatively, may lack an adhesive coating. The lift tab facilitates user grasping and separation of the layers, including, e.g., the lens layer, from the label.

Methods for Manufacturing the Lens Layer of the Multi-layered Label

Methods for manufacturing the magnifying lens layer for use in the multi-layered label of the invention are described in, e.g., U.S. Pat. No. 6,947,225, U.S. Pat. No. 7,767,728, U.S. Pat. No. 7,632,880, and U.S. patent application Publication No. 2010/0177406, each of which is incorporated by reference herein it its entirety. These methods include the use of high refractive index UV curable polymers for UV cast manufacturing of surface relief thin optical films. The methods described in the examples above may be optimized during manufacturing to improve the performance of the thin film magnifying lens by controlling properties of the embossing polymers and underlying film. Key aspects of the optimization include material characteristics such as transparency, temperature resistance, refractive index, antistatic properties, adhesion of embossing lacquers to base film, and the profile of the embossed microstructure.

The lens layer of the multi-layered label can also be manufactured according to methods described in Worgull, "Hot Embossing: Theory and Technology of Microreplication," Publisher: William Andrew, 2009.

Master molds for manufacturing lenses of the invention (e.g., a Fresnel lens) can be produced using, e.g., precision diamond machining. Methods for diamond machining of components are described in, e.g., Davies et al. (Proc. of SPIE, 5183:94-108, 2003). In particular diamond turning can be used to produce patterns of grooves for the Fresnel lens on a micrometer or nanometer scale. The traditional mold manufacturing method, single point diamond turning, uses just one cutting tool to produce a constant structure across the mold surface. A variable structure can be produced using, e.g., diamond contouring, which involves raising and lowering the single point to achieve facets of variable depth.

Another method for manufacturing the magnifying thin film lens structure (e.g., a Fresnel lens) of the invention is included angle diamond turning (InADiT). InADiT achieves a lens structure in which the pitch and depth of the facets vary across the surface of the structure. InADiT produces variations in prism angle across the film that can be used to create, e.g., sharper definition at the troughs and peaks of micro facets, which significantly improves optical performance of the magnifying lens. In addition, InADiT can be used to produce magnifying lenses (e.g., Fresnel lenses) at significantly cheaper production cost relative to traditional cast lenses due to the continuous high speed production process. These magnifying lenses also do not suffer from inferior optical performance due to losses associated with the high number of micro facets used, which can be a drawback of using some cutting processes. InADiT can be used to produce thin film Fresnel lenses in both point focus and linear focus formats that exhibit optical efficiencies in excess of 85%.

The InADiT process involves the use of a cutting tool in which the apex angle of the smallest facet required in the structure is chosen. Larger facets are produced by moving the tool within the prism. This method produces facets with very sharp peaks and troughs with no rounding at the extremities. The precise movement of the cutting tool in the InADiT process can be achieved using co-ordinated axis motion, which allows the movement of the cutting tool to be accurately controlled along four different axes.

Uses of the Multi-Layered Label

The multi-layered label can be affixed to an article (e.g., a pharmaceutical product, a bottle cap, a supplement product, a food product, a beverage product, a personal care product (e.g. a shampoo, conditioner, lotion, or skin cream), a cosmetic product, a perfume product, an agricultural chemical product, a veterinary product, an appliance, an electrical device, a book, a magazine, a product information sheet, advertising literature, promotional literature, a map, a menu, and a container) or article packaging at, e.g., its terminal layer using, e.g., a releasable or non-releasable adhesive material (e.g., a pressure sensitive adhesive (PSA)). Prior to fixation, the terminal layer of the multi-layered label may also include a release backing (i.e., a peelable material) that is attached to an exterior portion of the terminal layer that can be removed to expose a releasable or non-releasable adhesive material. Removal of the release backing exposes the adhesive material and allows the label to be affixed to the article or article packaging.

The multi-layered label can be provided such that the magnifying lens layer (along with other layers of the label, if desired) can be separated from the lower, terminal layer and used to magnify printed indicia present on one or more of the layers of the label, printed indicia present on a composition to which the label is affixed, or printed indicia present on other compositions. The magnifying lens layer can then be re-adhered to the multi-layered label using, e.g., a PSA.

In another embodiment, the multi-layered label is provided with a magnifying lens layer that is permanently bonded at a hinge region to the lower terminal layer. The multi-layered label may also include one or more additional layers that are also permanently bonded at the hinge region. In this embodiment, the magnifying lens layer may have the same dimensions as the lower terminal layer of the label (and any other layers included in the label) or it may have different dimensions. For example, the magnifying lens layer may have the same width as, but a greater length than, the other layer(s), which allows the magnifying lens layer to be extended away from the label in order to magnify printed indicia present on one or more of the layers of the label, printed indicia present on a composition to which the label is affixed, or printed indicia present on other compositions. The magnifying lens layer can then be returned to the label (e.g., refolded into the label) once e-adhered to the multi-layered label using, e.g., a PSA. Another optional embodiment is the presence of a perforation near the hinge region in the magnifying lens layer (or one or more of the other layers) that allows the magnifying lens (or other) layer to be separated from multi-layered label.

EXAMPLES

The following examples are to illustrate the invention. They are not meant to limit the invention in any way.

Example 1

Figure 5:
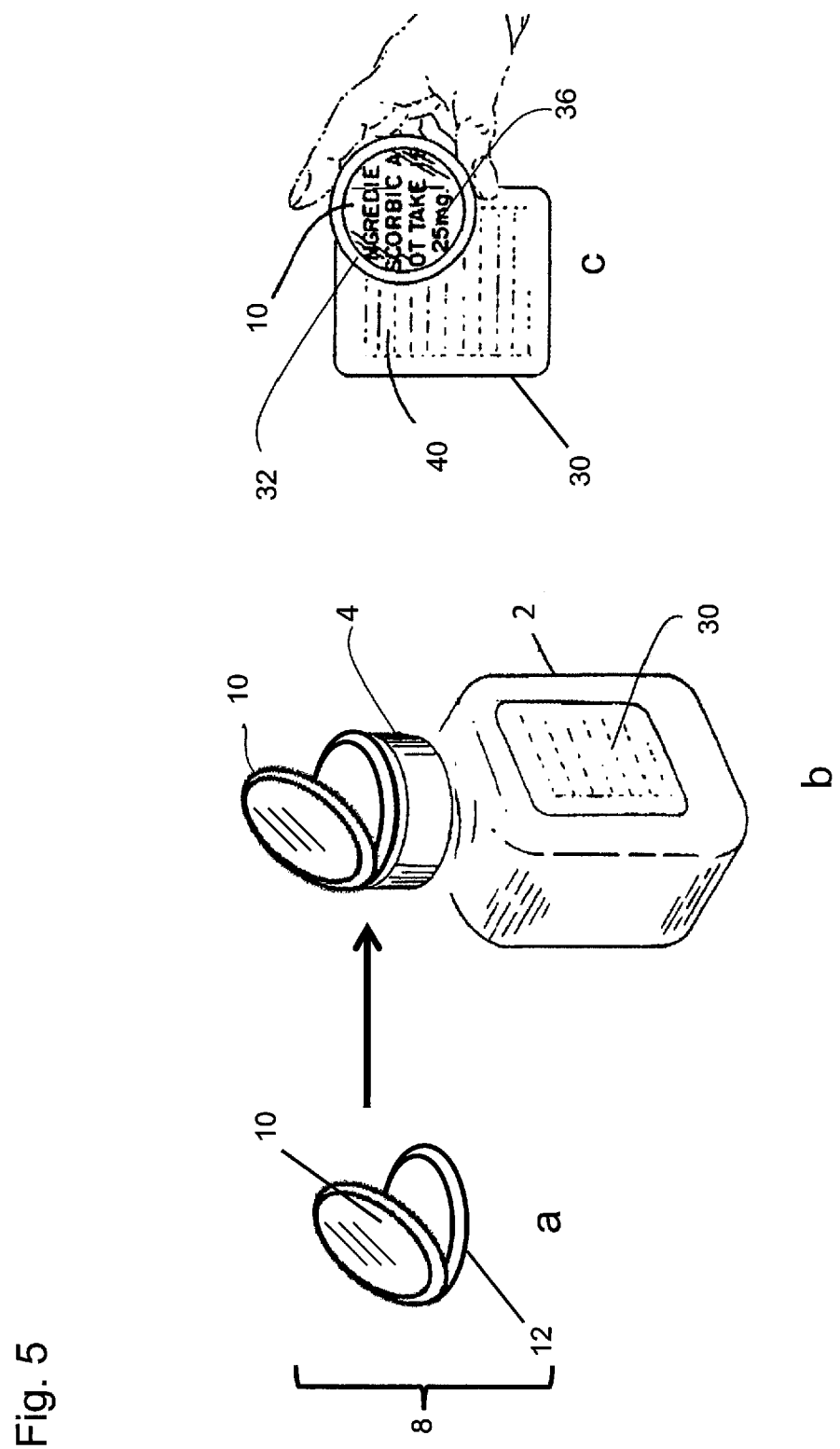
FIGS. 5(a)-(c) are views of another embodiment of a multi-layer label with integrated magnifying lens layer.

Application of the Multi-Layered Label with Integrated Thin Film Magnifier to the Cap of a Bottle In an embodiment, the multi-layered label with integrated thin film magnifier may be applied to a bottle cap (e.g., the cap of a pharmaceutical or other container (e.g., a food container)). FIG. 5(a) depicts a perspective view of multi-layered label (8) having two layers: a lower terminal layer (12) and an upper magnifying lens layer (10); FIG. 5(a) shows the magnifying lens layer (10) partially separated from terminal layer (12). FIG. 5(b) shows container (2) having container label (30) and cap (4) to which multi-layered label (8) has been affixed. Terminal layer (12) includes an adhesive material on its exterior surface for affixing multi-layered label (8) to cap (4). Terminal layer (12) may optionally have affixed to its exterior surface a thin peelable material having a non-adhesive exterior surface. The thin peelable material may be removed to expose the adhesive material on the exterior surface of terminal layer (12), thereby allowing multi-layered label (8) to be affixed to the surface of a composition (e.g., a pharmaceutical container, such as that shown in FIG. 5). Magnifying lens layer (10) may also include an adhesive material (e.g., a PSA) that allows it to be repeatedly removed from, and re-adhered to, terminal layer (12). The adhesive material allows magnifying lens layer (10) to be removed and re-attached to the surface of terminal layer (12) multiple times. Adhesive material may be applied to the entire surface of magnifying lens layer (10) or to a portion thereof (e.g., in a ring (32) around magnifying lens layer (10) (as shown in FIG. 5(c)) or in any number of different patterns).

Magnifying lens layer (10) can be constructed from any number of different flexible film materials. Examples of materials that can be used for magnifying lens layer (10) include but are not limited to: polyurethane, vinyl (e.g., polyvinylchloride (PVC)), acrylic (e.g., poly(methyl methacrylate) (PMMA)), polystyrene, polyethylene terephthalate (PET), polyethylene (PE; e.g., HDPE), or polycarbonate.

As shown in FIG. 5(c), magnifying lens layer (10) can be peeled away from the terminal layer and used to magnify printed indicia (40) present on container label (30) when positioned at a distance dictated by the focal length of the magnifier, such that the small print appears focused and magnified (36). Magnifying lens layer (10) can be used as an optical aid to magnify print or other objects as required by the person using the device. Following use, magnifying lens layer (10) can be re-adhered to the top surface of cap (4) where it will remain until the next time it is removed for use. Magnifying lens layer (10) can be removed and re-adhered multiple times as may be required for use.

Example 2

Multi-Layered Label with Integrated Thin Film Magnifier and Optional Pull Tab

Figure 6:
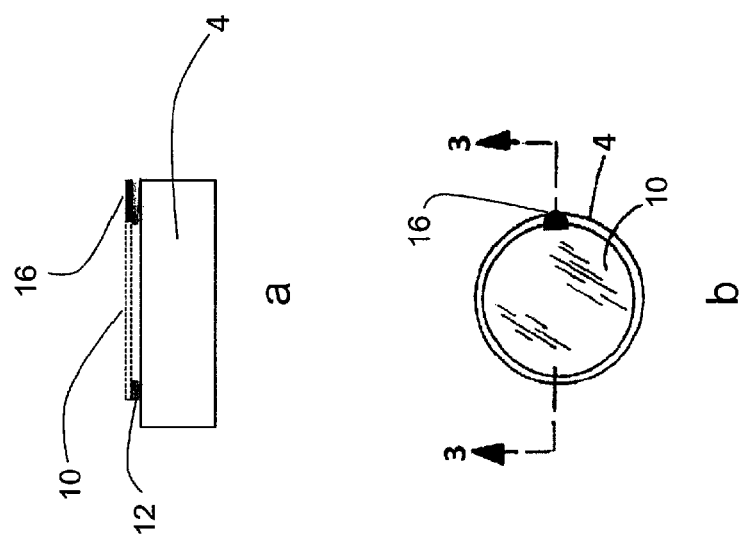
FIGS. 6(a) and (b) are cross-sectional (FIG. 6(a)) and top perspective (FIG. 6(b)) views of the bottle cap with affixed multi-layer label of FIG. 5(b) showing an optional pull tab (16).

FIG. 6(a) is a side perspective view of cap (4) from Example 1 above to which multi-layered label (8) (in which the layers are not partially separated) has been affixed. FIG. 6(a) depicts a cross-section view of magnifying lens layer (10) with optional pull tab (16) taken along the line 3-3 in FIG. 6(b) that includes a non-adhesive material that facilitates grasping and separation of magnifying lens layer (10) from terminal layer (12) of multi-layered label (8). Optional pull tab (16) may be limited to a single small area of magnifying lens layer (10) (as shown) or it may form a ring around the entire magnifying lens layer (10) such that magnifying lens layer (10) has a greater circumference relative to terminal layer (12).

FIG. 6(b) shows a top perspective view depicting optional pull tab (16) integrated into magnifying lens layer (10) of multi-layered label (8). Many other pull-tab designs can be envisioned to simplify the removal of the magnifying label and potentially to also serve as a handle or point by which to hold magnifying lens layer (10).

Example 3

Figure 7:
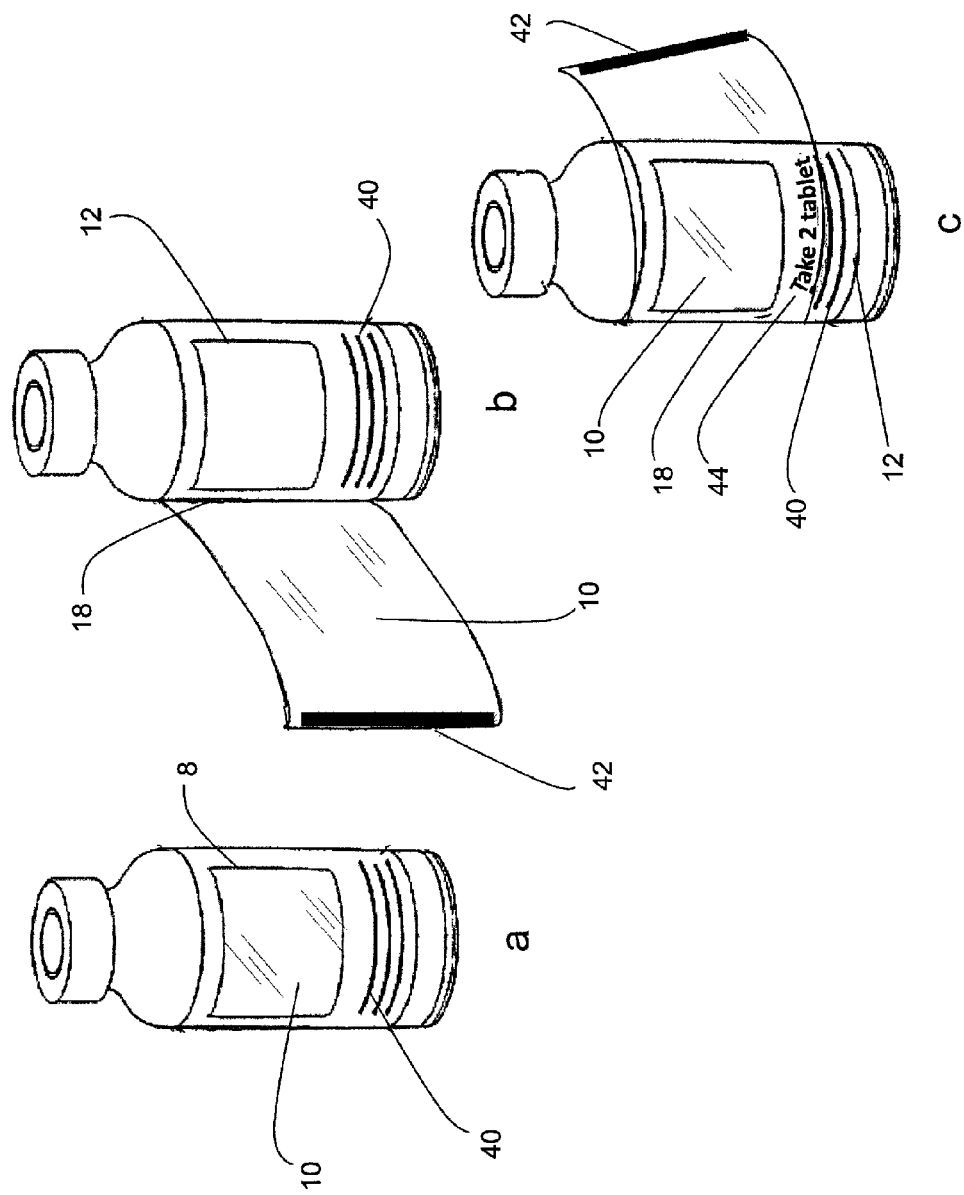
FIGS. 7(a)-(c) are perspective views of another multi-layer label (8) with an integrated magnifying lens layer embodiment of the present invention in which the magnifying lens layer is partially separated from multi-layered label (8) and is affixed at hinge region (18). Also shown is a non-permanent adhesive region (42) associated with magnifying lens layer portion (10).

Application of the Multi-Layered Label with Integrated Thin Film Magnifier to a Label of a Bottle Multi-layered label (8) may also be affixed to a composition, e.g., a container, such as a bottle, and used as the product label. Multi-layered label (8) may include one or more layers that provide indicia regarding the product (e.g., a tradename, manufacturer, source information, ingredient information, instructions for use, tradedress imagery, volume information, safety warnings, or preparation information (e.g., cooking instructions for food products)). As shown in FIG. 7(a), multi-layered label (8) includes magnifying lens layer (10) as an upper transparent layer and terminal layer (12) as a lower layer that includes printed indicia (40) about, e.g., the product. Magnifying lens layer (10) can be peeled back from the surface of terminal layer (12), which may be adhered to the surface of the container with a permanent adhesive. A non-permanent adhesive, such as a PSA, may be used to adhere magnifying lens layer (10) to the surface of terminal layer (12). Additional layers may be included between magnifying lens layer (10) and terminal layer (12). These additional layers can include additional information about the product or other related or unrelated products (e.g., products manufactured by the same manufacturer).

FIG. 7(b) shows magnifying lens layer (10) peeled away from terminal layer (12). As shown in FIG. 7(b), magnifying lens layer (10) may be affixed to terminal layer (12) at hinge region (18) (or, if other layers are present, magnifying lens layer (10) may be affixed to the adjacent layer below magnifying lens layer (10) or one or more (or all) layers of multi-layered label (8) may be affixed at hinge region (18)) using a permanent adhesive that prevents complete removal of magnifying lens layer (10) from multi-layered label (8). Magnifying lens layer (10) may also include non-permanent adhesive region (42) that may be, e.g., a PSA, that can be used to re-adhere magnifying lens layer (10) to the surface of multilayered label (8) below magnifying lens layer (10), which may be terminal layer (12) if multi-layered label (8) includes only two layers. Alternatively, all or a portion of magnifying lens layer (10) may include an adhesive material (e.g., a PSA) that allows it to be re-adhered along all or a portion of the surface of multi-layered label (8) below magnifying lens layer (10).

FIG. 7(c) is a front perspective view showing transparent magnifying lens layer (10) anchored at one end with permanent adhesive at hinge region (18) and positioned at an appropriate focal distance above printed indicia (40) such that the small print appears focused and magnified (44). The non-permanent adhesive region (42) of magnifying lens layer (10) can be re-adhered to the surface of multi-layered label (8) below magnifying lens layer (10) after use. The act of peeling back transparent magnifying lens layer (10) and re-adhering it to the surface of multi-layered label (8) below magnifying lens layer (10) can be repeated multiple times as may be required for use. Those skilled in the art of label manufacturing recognize that there are many types of adhesives and release coatings that can be employed in the construction of multi-layered and removable labels, and there are many different methods and patterns in which adhesives and release coatings can be applied to various label surfaces.

Example 4

Figure 8:
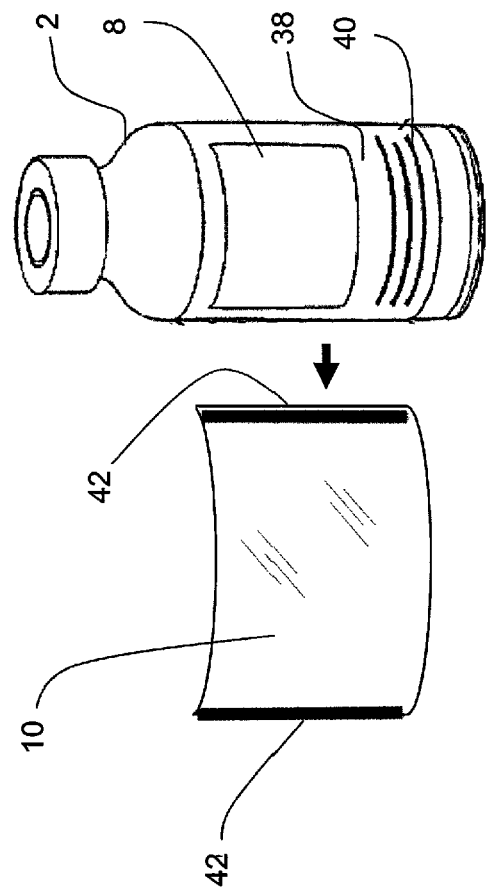
FIG. 8 is a perspective view of another multi-layer label (8) with an integrated magnifying lens layer embodiment of the present invention in which the magnifying lens layer is completely removed from multi-layer label (8), which remains affixed to container (2). Also shown are non-permanent adhesive regions (42) associated with magnifying lens layer portion (10) that facilitate adhesion of the magnifying lens layer to the multi-layer label.

Application of the Multi-Layered Label with Integrated Thin Film Magnifier to a Label of a Bottle Multi-layered label (8) may also include two or more layers, one or more layer of which can be completely separated from multi-layered label (8). As shown in FIG. 8, magnifying lens layer (10) may be completely separated from the surface of layer (38), which is below magnifying lens layer (10), of multi-layered label (8). Multi-layered label (8) may also include one, two, or more separate non-permanent adhesive regions (42) (in the pattern shown or in other patterns) that allow for the layer to be completely removed and re-adhered. Once removed, magnifying lens layer (10) can be used as an optical aid to read printed indicia (40) on multi-layered label (8), printed indicia on another, separate label affixed to container (2), or printed indicia on an unrelated container or article. Magnifying lens layer (10) can then be re-adhered to the top surface of the multi-layered label (8). This action of removal and reattachment of magnifying lens layer (10) can be repeated multiple times. Layer (38) may be the only additional layer of multi-layered label (8) or multi-layered label (8) may include several additional layers (e.g., 3, 4, 5, or more layers). The lowest layer of multi-layered label (8) that contacts the surface of container (2) may be permanently affixed to the container using a permanent adhesive material, such as those described herein.

FIG. 8 illustrates a single example of a multi-layered label with integrated thin film magnifier in which the magnifying film layer may be completely removed. This example is not meant limit the invention to this exact construction as many other label designs and constructions will be apparent to those skilled in the art of label design and manufacturing.

Furthermore, with respect to the above description and examples, it should be readily apparent and obvious to one skilled in the art, that the optimum construction of the multi-layered label of the present invention, may include variations in size, materials, shape, form, function, manner of operation, assembly, and use, and all equivalent relationships to those illustrated in the figures and described in the specification are intended to be encompassed by the present invention.

Although the figures illustrative of the invention show use of the multi-layered label in conjunction with containers, it is also envisioned that the label of the present invention is equally applicable to other forms of packaging or articles or in fact any item to which a label can be applied. This could also include items such as magazine publications, product information sheets, advertising brochures, maps, menus, appliances, electrical devices, and any other item to which a label may be applied or with which a label has been traditionally associated.

Example 5

Magnifying Thin Film Fresnel Lens

Another embodiment of the invention is a Fresnel lens that is 60 mm by 60 mm (width and length) and that will magnify text at a distance of 1 to 3.5 cm. The target magnification is about 2× to about 3× at 3.0 cm. The lens is produced on a 50 micron, PET film. The Fresnel lens will have a structure with a focal depth of Fd=1 (e.g., for a 60 mm edge length structure the focal depth would be 60 mm). With this configuration, the magnification achieved would be as follows:

2× magnifications at 2.5 cm;

3× magnifications at 3.33 cm; and at a distance of 1.25 cm the magnification would be 1.33×.

Tooling Development and Test Structure Production

A master mold for the proposed Fresnel lens structure could be produced by diamond turning and a copper-surfaced nickel master could be produced to manufacture the Fresnel lens. The master can be used to produce small batches of lenses.

For large quantities of lenses, the master can be replicated a number of times in nickel. The copies could then be welded together to produce a "shim." The shim can then be wrapped around a production drum and lenses produced in quantity. Lenses could be supplied on reels of about 300 m in length. If desired the lenses could be stamped out and supplied as individual units.

Other Embodiments

All publications, patents, and patent applications mentioned in the above specification are hereby incorporated by reference. Various modifications and variations of the described method and system of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

What is claimed is:

1. A label for application to a composition comprising a plurality of layers comprising a top layer, a terminal layer, and one or more additional layers, wherein at least one of said plurality of layers is a lens layer having a thickness of about 400 μm or less and comprising a lens for magnifying indicia present on said label or said composition, and wherein there is substantially no void space between said plurality of layers.

2. The label of claim 1, wherein said lens is a Fresnel lens.

3. The label of claim 1, wherein said composition is a pharmaceutical product, a bottle cap, an agricultural chemical product, a veterinary product, a personal care product, a supplement product, a food product, a beverage product, a cosmetic product, a book, a magazine, a product information sheet, advertising literature, promotional literature, a map, a menu, an appliance, an electrical device, or a container.

4. The label of claim 1, wherein said label comprises more than three layers.

5. The label of claim 1, wherein said layers are self-overlapping.

6. The label of claim 1, wherein said label comprises an adhesive material.

7. The label of claim 1, wherein at least a portion of the outer surface of the terminal layer comprises an adhesive material.

8. The label of claim 7, wherein the outer surface of the terminal layer comprises a release backing material that covers, and can be removed to expose, the adhesive material.

9. The label of claim 1, wherein one or more of said plurality of layers comprises an adhesive material.

10. The label of claim 9, wherein said adhesive material is a substantially non-releasable adhesive material that covers at least a first edge portion of said plurality of layers to form a hinge region.

11. The label of claim 1, wherein said top layer comprises said lens.

12. The label of claim 1, wherein one or more of said layers comprises printed matter.

13. The label of claim 1, wherein said lens layer is a plastic material.

14. A composition comprising the label of claim 1 affixed thereto.

15. The label of claim 1, wherein a bottom surface of said terminal layer is at least partially coated with an adhesive material and wherein a release backing material is affixed to the bottom surface of said terminal layer by said adhesive material, wherein said release backing material is separable from said terminal layer to expose said adhesive material.

16. The label of claim 1, wherein said lens layer has a thickness allowing for a magnification strength in the range of about 1.2× to about 20×.

17. The label of claim 1, wherein at least one of said plurality of layers further comprises a security feature selected from the group consisting of microtext, a self-destructing label, a void label, a security label, a holographic foil security label configured to separate into further layers when removed from said label, a radio-frequency identification (RFID) tag, a security taggant, a specialty ink that can be detected with ultra-violet light, and a specialty ink that can be detected with infrared light.

18. A label for application to a composition, comprising a first layer comprising a substantially flat, flexible lens for magnifying indicia present on said label or said composition, said first layer having a thickness of about 400 µm or less and top and bottom surfaces, wherein said bottom surface is at least partially coated with an adhesive material,
 a second layer comprising a release backing material that is affixed to the bottom surface of said first layer by said adhesive material, wherein said second layer is separable from said first layer to expose said adhesive material on said first layer, and
 one or more additional layers.

19. The label of claim 18, wherein said second layer comprises a plastic or paper release backing.

20. The label of claim 18, wherein said lens is a Fresnel lens.

21. The label of claim 18, wherein said one or more additional layers comprise printed indicia.

22. A composition comprising the label of claim 18 affixed thereto.

23. The label of claim 18, wherein at least one of the layers further comprises a security feature selected from the group consisting of microtext, a self-destructing label, a void label, a security label, a holographic foil security label configured to separate into further layers when removed from said label, a radio-frequency identification (RFID) tag, a security taggant, a specialty ink that can be detected with ultra-violet light, and a specialty ink that can be detected with infrared light.

24. A label for application to a composition comprising a plurality of layers comprising a top layer, a terminal layer, and one or more additional layers, wherein at least one of said plurality of layers is a lens layer comprising a lens for magnifying indicia present on said label or said composition, and wherein there is substantially no void space between said plurality of layers and each layer of said plurality of layers lies flat against an adjacent layer with no creases therein.

25. The label of claim 24, wherein said lens is a Fresnel lens.

26. The label of claim 24, wherein said label comprises an adhesive material.

27. The label of claim 24, wherein at least a portion of the outer surface of the terminal layer comprises an adhesive material.

28. The label of claim 27, wherein the outer surface of the terminal layer comprises a release backing material that covers, and can be removed to expose, the adhesive material.

29. The label of claim 24, wherein one or more of said plurality of layers comprises an adhesive material.

30. The label of claim 24, wherein said lens layer is a plastic material.

31. The label of claim 24, wherein said lens layer has a thickness allowing for a magnification strength in the range of about 1.2× to about 20×.

32. The label of claim 24, wherein said lens layer has a thickness of about 400 µm or less.

33. The label of claim 24, wherein at least one of said plurality of layers further comprises a security feature selected from the group consisting of microtext, a self-destructing label, a void label, a security label, a holographic foil security label configured to separate into further layers when removed from said label, a radio-frequency identification (RFID) tag, a security taggant, a specialty ink that can be detected with ultra-violet light, and a specialty ink that can be detected with infrared light.

\* \* \* \* \*